United States Patent
Akiba et al.

(10) Patent No.: US 10,858,518 B2
(45) Date of Patent: Dec. 8, 2020

(54) ARYLENE GROUP-CONTAINING ORGANOPOLYSILOXANE AND CURABLE ORGANOPOLYSILOXANE COMPOSITION USING SAME

(71) Applicant: SHIN-ETSU CHEMICAL CO., LTD., Tokyo (JP)

(72) Inventors: Tomoki Akiba, Annaka (JP); Tadashi Araki, Annaka (JP); Takafumi Sakamoto, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 58 days.

(21) Appl. No.: 16/470,932

(22) PCT Filed: Nov. 6, 2017

(86) PCT No.: PCT/JP2017/039853
§ 371 (c)(1),
(2) Date: Jun. 18, 2019

(87) PCT Pub. No.: WO2018/116662
PCT Pub. Date: Jun. 28, 2018

(65) Prior Publication Data
US 2019/0338126 A1 Nov. 7, 2019

(30) Foreign Application Priority Data
Dec. 19, 2016 (JP) ................. 2016-245045

(51) Int. Cl.
| C08G 77/18 | (2006.01) |
| C08L 83/14 | (2006.01) |
| C08G 77/52 | (2006.01) |
| C09K 3/10 | (2006.01) |

(52) U.S. Cl.
CPC .............. C08L 83/14 (2013.01); C08G 77/52 (2013.01); C09K 3/1018 (2013.01); C08G 2190/00 (2013.01); C08L 2203/20 (2013.01); C08L 2205/025 (2013.01); C09K 2200/0685 (2013.01)

(58) Field of Classification Search
CPC ......... C08G 77/52; C08G 77/50; C08L 83/04; C08L 83/06
See application file for complete search history.

(56) References Cited

U.S. PATENT DOCUMENTS

| 3,398,175 | A | * | 8/1968 | Leitheiser | ............... | C08G 77/52 |
| | | | | | | 556/433 |
| 4,518,759 | A | * | 5/1985 | Rosenberg | ............... | C07F 7/0836 |
| | | | | | | 528/35 |
| 4,711,928 | A | * | 12/1987 | Lee | ........................ | C08G 77/50 |
| | | | | | | 524/860 |
| 4,772,675 | A | * | 9/1988 | Klosowski | ............ | C08K 5/5415 |
| | | | | | | 528/15 |
| 4,870,115 | A | | 9/1989 | Itoh et al. | | |
| 5,340,899 | A | * | 8/1994 | Altes | ........................ | C08G 77/50 |
| | | | | | | 524/731 |
| 5,763,540 | A | | 6/1998 | Nakata et al. | | |
| 5,976,703 | A | | 11/1999 | Nakata et al. | | |
| 6,072,016 | A | * | 6/2000 | Kobayashi | ............. | C08G 77/52 |
| | | | | | | 525/477 |

(Continued)

FOREIGN PATENT DOCUMENTS

| JP | 1-236249 A | 9/1989 |
| JP | 5-320350 A | 12/1993 |

(Continued)

OTHER PUBLICATIONS

Ando et al., "Polysiloxane Network Formation Observed by Time-Resolved Small-Angle X-ray Scattering", Polymer Gels and Networks, vol. 1, 1993, pp. 45-60.

(Continued)

*Primary Examiner* — Margaret G Moore
(74) *Attorney, Agent, or Firm* — Birch, Stewart, Kolasch & Birch, LLP

(57) ABSTRACT

Provided is a curable organopolysiloxane composition from which highly heat-resistant cured products can be obtained, the curable organopolysiloxane composition comprising: (A) 100 parts by mass of a novel organopolysiloxane represented by formula (1)

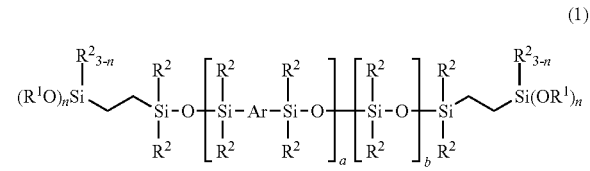

(1)

($R^1$ is an alkyl group or an alkoxy substituted alkyl group having 1 to 6 carbon atoms, $R^2$ is a group selected from an alkyl group having 1 to 20 carbon atoms, an aryl group having 6 to 20 carbon atoms, and a group in which a portion of the hydrogen atoms of those groups is substituted with a halogen atom, Ar is an arylene group having 6 carbon atoms or more, a is 1 to 1,000, b is 1 to 5,000, and n is 1 to 3, the total of n in an unsubstituted or substituted alkoxysilyl group on both ends of the molecular chain being 3 or more); and (B) 0.01 to 10 parts by mass of a curing catalyst. Also provided are electrical and electronic components, a vehicle oil seal, a building sealant, etc. which use the cured product of the composition.

7 Claims, No Drawings

(56) References Cited

U.S. PATENT DOCUMENTS

| | | | | |
|---|---|---|---|---|
| 6,114,487 A | * | 9/2000 | Kobayashi | C08G 77/52 528/15 |
| 2003/0009000 A1 | | 1/2003 | Singh et al. | |
| 2015/0144987 A1 | | 5/2015 | Hamamoto et al. | |

FOREIGN PATENT DOCUMENTS

| | | |
|---|---|---|
| JP | 9-59387 A | 3/1997 |
| JP | 2004-505146 A | 2/2004 |
| JP | 2008-291148 A | 12/2008 |
| JP | 2013-107983 A | 6/2013 |
| JP | 2013-107985 A | 6/2013 |
| JP | 2015-7203 A | 1/2015 |
| JP | 2015-101645 A | 6/2015 |
| JP | 2017-171832 A | 9/2017 |

OTHER PUBLICATIONS

International Search Report for PCT/JP2017/039853 (PCT/ISA/210) dated Jan. 23, 2018.
Written Opinion of the International Searching Authority for PCT/JP2017/039853 (PCT/ISA/237) dated Jan. 23, 2018.
Yamanaka et al., "Polysiloxane Network: Structural Characteristics and Formation Mechanism", vol. 20, No. 3, 1999, pp. 157-163.

\* cited by examiner

ARYLENE GROUP-CONTAINING ORGANOPOLYSILOXANE AND CURABLE ORGANOPOLYSILOXANE COMPOSITION USING SAME

TECHNICAL FIELD

The present invention relates to a curable organopolysiloxane composition and an article having a cured product of the composition characterized in that a novel arylene group-containing organopolysiloxane and the cured product using the same have highly heat-resistance.

BACKGROUND ART

Polysiloxanes having a repeating unit of silicon-oxygen bond, so-called silicone resins or silicone rubbers, generally have characteristics such as heat resistance, weather resistance, cold resistance, oil resistance, chemical resistance and flexibility for wide use in electrical and electronic materials, sealants, vehicle components and the like. In general, silicone resins or silicone rubbers for use in these applications improve the heat resistance in the following manner. For example, improvement of the purity of oil by removing ionic impurities is known. Also included is provision of heat resistance, for example, by using cerium salts as described in JP-A 2008-291148 (Patent Document 1), or iron carboxylate as described in JP-A 2015-007203 (Patent Document 2), as well as adding oxides, fatty acid salts or carbonates of metals such as rare earth, titanium, zirconium, manganese, iron, cobalt and nickel, and adding fillers such as silica.

Highly heat-resistant silicone resins or silicone rubbers have been provided by using the above method. However, rare earth elements such as cerium have problems with stable availability, and a reaction product is required to be added which has undergone premixing of the metal salt with an organopolysiloxane and heat treatment, as described in JP-A 2008-291148 and JP-A 2015-007203. Accordingly, shortening of the steps and simplification of supply of the raw materials have been required.

Therefore, a method for improving heat resistance of the substrate itself is used by changing the silicone resin backbone itself. Specifically, excellent properties such as heat resistance, cold resistance and high refractive index can be imparted by using a polysiloxane containing a phenyl group on the side chain. However, the heat resistance of a conventional polysiloxane containing a phenyl group on the side chain is insufficient because development of more highly heat-resistant silicone is desired with recent advancement of functions of electrical and electronic components and appearance of power semiconductors.

PRIOR ART DOCUMENTS

Patent Documents

Patent Document 1: JP-A 2008-291148
Patent Document 2: JP-A 2015-007203

SUMMARY OF INVENTION

Technical Problem

The present invention has been made in view of the above circumstances, and has an object to provide a novel arylene group-containing organopolysiloxane, a curable organopolysiloxane composition giving a cured product having high heat resistance obtained by using the novel arylene group-containing organopolysiloxane, and an electrical and electronic component, a vehicle oil seal, a building sealant and the like in which the cured product of the composition is used.

Solution to Problem

As a result of intensive studies to achieve the above object, the present inventors have found that a curable organopolysiloxane composition comprising a novel arylene group-containing organopolysiloxane represented by the general formula (1) described later having an arylene group introduced into the main chain backbone and a catalyst for curing the organopolysiloxane can form a cured product with the same composition as that of existing dimethyl and side chain phenylorganopolysiloxane (such as dimethylsiloxane/diphenylsiloxane copolymer or dimethylsiloxane/methylphenylsiloxane copolymer), and further can become a cured product with high heat resistance, and this invention has been completed.

Accordingly, the present invention provides the following a curable organopolysiloxane composition, an electrical and electronic component, a vehicle oil seal or a building sealant in which a cured product of the composition is used, and a novel organopolysiloxane.

[1]

A curable organopolysiloxane composition comprising:

(A) 100 parts by weight of an organopolysiloxane represented by the following general formula (1):

[Chem. 1]

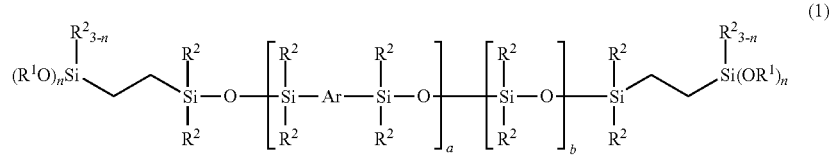

(1)

wherein $R^1$ is the same or different alkyl group or alkoxy-substituted alkyl group having 1 to 6 carbon atoms, $R^2$ is a group selected from the same or different alkyl group having 1 to 20 carbon atoms, an aryl group having 6 to 20 carbon atoms, and a group in which a part of the hydrogen atoms of these groups is substituted with a halogen atom, Ar is an arylene group having 6 or more carbon atoms, a is an integer of 1 to 1,000, b is an integer of 1 to 5,000, and n is each independently an integer of 1 to 3, provided that the total of n in unsubstituted or substituted alkoxysilyl groups present at both terminals of the molecular chain is 3 or more, and (B) 0.01 to 10 parts by weight of a curing catalyst.

[2]

The curable organopolysiloxane composition according to [1] wherein the curing catalyst is a tin-containing metal compound.

[3]

The curable organopolysiloxane composition according to [1] or [2] further comprising:

(C) 1 to 500 parts by weight of an organopolysiloxane containing two or more hydroxy groups or unsubstituted or alkoxy-substituted alkoxy groups in one molecule represented by any of the following general formulae (2) to (4), per 100 parts by weight of the component (A):

[Chem. 2]

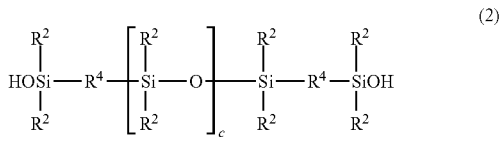

(2)

[Chem. 3]

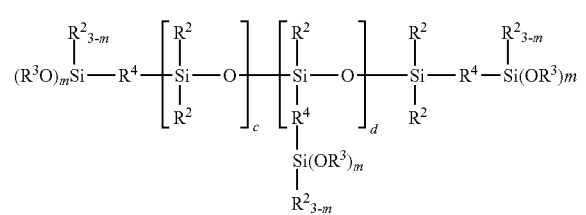

(3)

[Chem. 4]

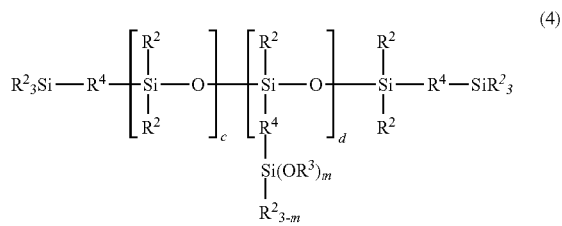

(4)

wherein $R^2$ is a group selected from the same or different alkyl group having 1 to 20 carbon atoms, an aryl group having 6 to 20 carbon atoms, and a group in which a part of the hydrogen atoms of these groups is substituted with a halogen atom, $R^3$ is a hydrogen atom, or the same or different alkyl group or alkoxy-substituted alkyl group having 1 to 6 carbon atoms, $R^4$ is an oxygen atom or the same or different alkylene group having 1 to 12 carbon atoms, m is each independently an integer of 1 to 3, c is an integer of 1 or more and d is an integer of 1 to 10.

[4]

An electrical and electronic component having a cured product layer of the curable organopolysiloxane composition according to any one of [1] to [3].

[5]

A vehicle oil seal comprising a cured product of the curable organopolysiloxane composition according to any one of [1] to [3].

[6]

A building sealant comprising a cured product of the curable organopolysiloxane composition according to any one of [1] to [3].

[7]

An organopolysiloxane represented by the following general formula (1):

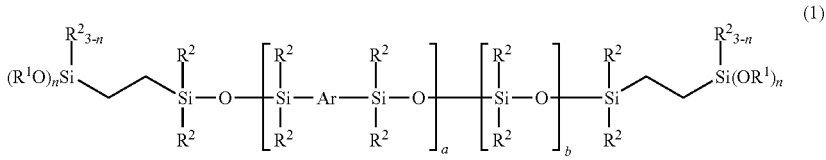

(1)

wherein $R^1$ is the same or different alkyl group or alkoxy-substituted alkyl group having 1 to 6 carbon atoms, $R^2$ is a group selected from the same or different alkyl group having 1 to 20 carbon atoms, an aryl group having 6 to 20 carbon atoms, and a group in which a part of the hydrogen atoms of these groups is substituted with a halogen atom, Ar is an arylene group having 6 or more carbon atoms, a is an integer of 1 to 1,000, b is an integer of 1 to 5,000, and n is each independently an integer of 1 to 3, provided that the total of n in unsubstituted or substituted alkoxysilyl groups present at both terminals of the molecular chain is 3 or more.

Advantageous Effects of Invention

According to the curable organopolysiloxane composition of the present invention, a cured product having higher heat resistance can be more easily obtained, compared to the conventional compositions.

DESCRIPTION OF EMBODIMENTS

The curable organopolysiloxane composition of the present invention comprises:

(A) an organopolysiloxane represented by the general formula (1) described later having an arylene group on the main chain, (B) a curing catalyst, and further comprises:

(C) an organopolysiloxane containing two or more hydroxy groups or unsubstituted or alkoxy-substituted alkoxy groups in one molecule represented by any of the general formulae (2) to (4) described later, if necessary.

[Component (A)]

The component (A), which is a main component (base polymer) of the curable organopolysiloxane composition of the present invention, is a novel linear organopolysiloxane having an arylene group as a silarylene siloxane unit [—Si$(R^2)_2$—Ar—Si$(R^2)_2$O—] in the main chain backbone, along with a total of 3 or more, particularly 3 to 6 alkoxy groups and/or alkoxy-substituted alkoxy groups in the unsubstituted or substituted alkoxysilyl groups present at both terminals of the molecular chain, represented by the following general formula (1):

[Chem. 6]

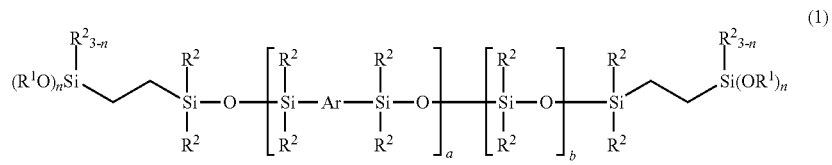

(1)

Wherein $R^1$ is the same or different alkyl group or alkoxy-substituted alkyl group having 1 to 6 carbon atoms. Examples of the alkyl group include a methyl group, ethyl group, propyl group, isopropyl group, butyl group, isobutyl group, sec-butyl group, tert-butyl group, cyclohexyl group and so on. Examples of the alkoxy-substituted alkyl group include a methoxymethyl group, methoxyethyl group, ethoxymethyl group, ethoxyethyl group and so on.

$R^2$ is a group selected from the same or different alkyl group having 1 to 20 carbon atoms, an aryl group having 6 to 20 carbon atoms and a group in which a part of the hydrogen atoms of these groups is substituted with a halogen atom. Examples of the alkyl group include a methyl group, ethyl group, propyl group, isopropyl group, butyl group, isobutyl group, sec-butyl group, tert-butyl group, pentyl group, hexyl group, cyclohexyl group and so on. Examples of the aryl group include a phenyl group and so on. Examples of the halogen-substituted group include 3,3,3-trifluoropropyl group and so on.

Ar is an arylene group having 6 or more, particularly 6 to 20, more particularly 6 to 12 carbon atoms, and examples thereof include o-, m- or p-phenylene group, naphthylene group, biphenylene group and so on n is each independently an integer of 1 to 3, preferably 2 or 3, more preferably 3, and in the organopolysiloxane of the general formula (1), the total of unsubstituted or substituted alkoxy groups ($OR^1$s) bonded to a silicon atom in the unsubstituted or substituted alkoxysilyl groups present at both terminals of the molecular chain (total of n in one molecule) is 3 or more, particularly 3 to 6.

In the general formula (1), a representing the repeating number (degree of polymerization) of the silarylene siloxane unit [—Si$(R^2)_2$—Ar—Si$(R^2)_2$O—] in the molecule is an integer of 1 to 1,000, preferably an integer of 50 to 600, more preferably an integer of about 80 to 300, b representing the repeating number (degree of polymerization) of the disiloxane unit [—Si$(R^2)_2$O—] in the molecule is an integer of 1 to 5,000, preferably an integer of 50 to 1,200, more preferably an integer of about 80 to 1,000, and a+b is usually an integer of 10 to 5,300, preferably an integer of 100 to 1,600, more preferably an integer of about 200 to 1,200. Furthermore, b≥a is preferable, and if b≥a, 100×a/(a+b)=5 to 50 is preferable. For example, if a=100 and b=1,900, 100×a/(a+b)=5, and if a=100 and b=100, 100×a/(a+b)=50. If 100×a/(a+b)=50 or more, the organopolysiloxane represented by formula (1) becomes solid at room temperature (25° C.±10° C.), which adversely affects the workability.

Conversely, if 100×a/(a+b)=5 or less, it is difficult to obtain sufficient heat resistance because the proportion of arylene group in the organopolysiloxane represented by formula (1) is small.

In the compound of the general formula (1), arrangement of the silarylene siloxane unit [—Si$(R^2)_2$—Ar—Si$(R^2)_2$O—] and the diorganosiloxane unit [—Si$(R^2)_2$O—] is random.

In the present invention, the repeating number (degree of polymerization) of repeating unit can be determined, for example, as the number average degree of polymerization (or number average molecular weight) in terms of polystyrene in gel permeation chromatography (GPC) analysis using tetrahydrofuran or the like as a developing solvent. More specifically, the number average molecular weight of the compound represented by the above general formula (1) or the like in terms of polystyrene can be determined in gel permeation chromatography analysis using a column manufactured by Tosoh Corporation: TSKgel Super H2500 (one) and TSKgel Super HM-N (one), solvent: tetrahydrofuran, flow rate: 0.6 mL/min, detector: RI (40° C.) under conditions of column temperature of 40° C., injection volume of 50 μL and sample concentration of 0.3% by weight (hereinafter, the same applies).

[Method for Producing Component (A)]

The novel organopolysiloxane represented by the above general formula (1) having an arylene group in the main chain can be produced, for example, by performing an addition reaction for hydrosilylation of vinyl groups in an organopolysiloxane represented by the following formula (1') having the vinyl groups bonded to a silicon atom at both terminals of the molecular chain and having an arylene group in the main chain with an SiH group (hydrosilyl group) in a hydrolyzable group-containing organohydrogensilane compound represented by the formula: $(R^1O)_n(R^2)_{(3-n)}SiH$ ($R^1$, $R^2$ and n are each as defined above, and the same applies hereinafter) in the presence of a catalyst such as a platinum-group metal:

[Chem. 7]

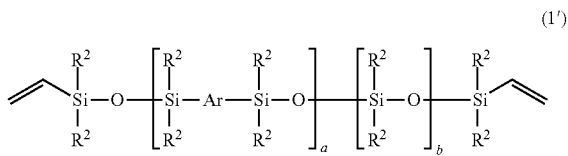

(1')

wherein $R^2$, Ar, a and b are as defined above.

More specifically, it can be produced, for example, by the following operation.

Into a separable flask equipped with a reflux tube, the organopolysiloxane represented by the general formula (1') having vinyl groups bonded to a silicon atom at both terminals of the molecular chain and having an arylene group in the main chain is added, and a solution of [chloroplatinic acid/vinylsiloxane] complex in dimethylpolysiloxane (about 1% by weight in terms of the weight of platinum atom) is added in an amount of about 0.01 to 0.1% by weight per the organopolysiloxane of the general formula (1'), followed by heating and stirring until the internal temperature of the flask reaches about 80 to 100° C. Next, the organohydrogensilane represented by the general formula: $(R^1O)_n(R^2)_{(3-n)}SiH$ ($R^1$, $R^2$ and n are as defined above) is added in an amount of 0.1 to 20 parts by weight, preferably 0.5 to 10 parts by weight, per 100 parts by weight of the organopolysiloxane of the above general formula (1'), in particular 1.1-fold moles or more, preferably 1.1 to 3.0-fold moles per the vinyl group in the organopolysiloxane of the above general formula (1'), followed by stirring for about 6 to 12 hours at 80 to 100° C. Subsequently, volatile components are evaporated by heating under reduced pressure, and to the reaction solution (crude product) after evaporation, activated carbon of about pH 6.6 is added in an amount of about 1 to 5% by weight per the weight of the whole reaction solution to remove colored components in the reaction solution. In this way, the organopolysiloxane represented by the above general formula (1) having an arylene group in the main chain can be obtained.

[Component (B)]

The curing catalyst of the component (B) cures the component (A) in the composition of the present invention. Examples of the curing catalyst include tin ester compounds such as tin dioctoate, alkyltin ester compounds such as dibutyltin diacetate, dibutyltin dilaurate and dibutyltin dioctoate, titanate ester or titanium chelate compounds such as tetraisopropoxy titanium, tetra n-butoxy titanium, tetrakis (2-ethylhexoxy) titanium, dipropoxy bis(acetylacetona) titanium and titanium isopropoxy octylene glycol, organic metal compounds such as zinc naphthenate, zinc stearate, zinc 2-ethyl octoate, iron 2-ethyl hexoate, cobalt 2-ethyl hexoate, manganese 2-ethyl hexoate, cobalt naphthenate and alkoxy aluminum compounds, aminoalkyl-substituted alkoxysilanes such as 3-aminopropyltriethoxysilane and N-β(aminoethyl) γ-aminopropyltrimethoxysilane, amine compounds and salts thereof such as hexylamine, dodecylamine phosphate, tetramethylguanidine and diazabicyclononane, quaternary ammonium salts such as benzyl triethyl ammonium acetate, alkali metal lower fatty acid salts such as potassium acetate, sodium acetate and lithium borate, dialkylhydroxylamine such as dimethylhydroxylamine and diethylhydroxylamine, and guanidyl group-containing silanes or siloxanes such as tetramethyl guanidyl propyl trimethoxysilane, tetramethyl guanidyl propyl methyl dimethoxysilane and tetramethyl guanidyl propyl tris(trimethylsiloxy) silane. In particular, tin ester compounds such as dioctoate tin, alkyltin ester compounds such as dibutyltin diacetate, dibutyltin dilaurate and dibutyltin dioctoate, amine compounds such as tetramethylguanidine and diazabicyclononane, guanidyl group containing—silanes or siloxanes such as tetramethyl guanidyl propyl trimethoxysilane, tetramethyl guanidyl propyl methyl dimethoxysilane and tetramethyl guanidyl propyl tris(trimethylsiloxy) silane are suitably used. In particular, tin-containing compounds such as tin ester compounds and alkyl tin ester compounds are suitably used. These are not limited to one type, but may be used as a mixture of two or more types.

The blending amount of the curing catalyst is 0.01 to 10 parts by weight, preferably 0.1 to 2 parts by weight, per 100 parts by weight of the component (A). If the blending amount of the component (B) is less than 0.01 parts by weight, per 100 parts by weight of the component (A), curing does not occur so that a cured product cannot be obtained. If the blending amount of the component (B) is more than 10 parts by weight, per 100 parts by weight of the component (A), the component (B) remaining in the cured product adversely affects the organopolysiloxane backbone of the component (A), so that heat resistance of the cured product is reduced.

[Component (C)]

The component (C), which is an optional component that may be blended in the composition of the present invention, if necessary, for acting as a curing assistant (crosslinking agent) that aids in curing (crosslinking) of the component (A) in the presence of the component (B), is a linear organopolysiloxane containing in the backbone (at the terminal of the molecular chain and/or non-terminal of the molecular chain (on the side chain of the molecular chain)) in one molecule two or more hydroxy groups (hydroxysilyl groups or hydroxysilyl-substituted alkyl groups), or unsubstituted or alkoxy-substituted alkoxy groups (alkoxysilyl groups, alkoxysilyl-substituted alkyl groups, (alkoxy-substituted alkoxy) silyl groups, or (alkoxy-substituted alkoxysilyl)-substituted alkyl groups), which organopolysiloxane is represented by the following formulae (2) to (4).

[Chem. 8]

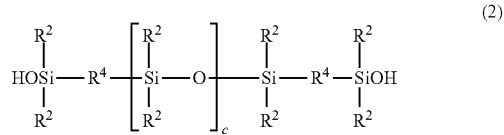

(2)

[Chem. 9]

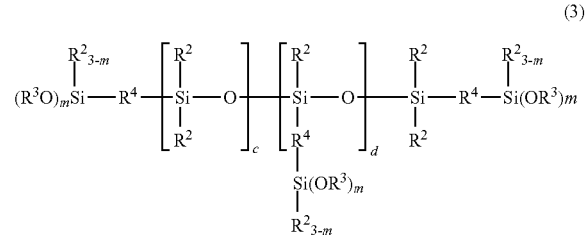

(3)

[Chem. 10]

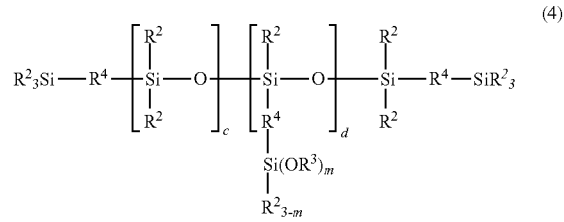

(4)

In the above general formulae (2) to (4), $R^2$ is a group selected from the same or different alkyl group having 1 to 20 carbon atoms, an aryl group having 6 to 20 carbon atoms and a group in which a part of the hydrogen atoms of these groups is substituted with a halogen atom, and examples of the groups may include those as exemplified for $R^2$ of the above formula (1).

$R^3$ is a hydrogen atom, or the same or different alkyl group or alkoxy-substituted alkyl group having 1 to 6 carbon atoms, and examples of the alkyl group or the alkoxy-substituted alkyl group having 1 to 6 carbon atoms may include those as exemplified for $R^1$ of the above formula (1).

$R^4$ is an oxygen atom or the same or different alkylene group having 1 to 12 carbon atoms, and examples of the alkylene group include methylene, ethylene, propylene (trimethylene, methylethylene and dimethylmethylene groups), butylene (tetramethylene and methylpropylene groups), hexamethylene, octamethylene groups and so on.

m is each independently an integer of 1 to 3, preferably 2 or 3, more preferably 3, c is an integer of 1 or more (usually an integer of 1 to 1,000, preferably 3 to 500, more preferably about 10 to 300) and d is an integer of 1 to 10, preferably an integer of 1 to 5.

In the compounds of the general formulae (3) and (4), arrangement of the siloxane unit represented by [—Si($R^2$)$_2$O—] and the siloxane unit represented by [—Si$R^2$($R^4$Si(O$R^3$)$_m$$R^2$$_{3-m}$)O—] is random. In the compounds of the general formulae (3) and (4), the total of m in the unsubstituted or substituted alkoxysilyl group present in the molecule is preferably 3 or more.

When the component (C) is blended, the component (C) is preferably used in an amount of 1 to 500 parts by weight, more preferably 10 to 150 parts by weight, particularly preferably 50 to 100 parts by weight, per 100 parts by weight of the component (A). If the amount of the component (C) is more than 500 parts by weight, per 100 parts by weight of the component (A), the proportion of the component (A) in the cured product is reduced, so that heat resistance may be lowered.

[Other Optional Component]

In addition to the above components (A) to (C), an optional component may be blended in the curable organopolysiloxane composition of the present invention as long as the object of the present invention is not impaired. Example of the optional component include a reaction inhibitor, mineral filler, nonfunctional organopolysiloxane free of a silicon atom-bonded hydrogen atom or silicon atom-bonded alkenyl group (so-called nonfunctional dimethyl silicone oil etc.), heat resistance imparting agent, flame retardance imparting agent, thixotropy imparting agent, pigment and dye.

The reaction inhibitor is a component for suppressing the reaction of the above composition, and specific examples thereof include acetylene-based, amine-based, carboxylate ester-based and phosphite ester-based reaction inhibitors.

Examples of the mineral filler include mineral fillers such as fumed silica, crystalline silica, precipitated silica, hollow filler, silsesquioxane, fumed titanium dioxide, magnesium oxide, zinc oxide, iron oxide, aluminum hydroxide, magnesium carbonate, calcium carbonate, zinc carbonate, layered mica, carbon black, diatomaceous earth and glass fiber; and fillers obtained by surface-hydrophobicizing any of these fillers with an organosilicon compound such as an organoalkoxysilane compound, organochlorosilane compound, organosilazane compound and low molecular weight siloxane compound. Silicone rubber powder, silicone resin powder, etc. may also be blended.

The curable organopolysiloxane composition of the present invention can be obtained by uniformly mixing predetermined amounts of the components (A) and (B), and, if necessary, the component (C) and the other component in a dry atmosphere.

The curable organopolysiloxane composition thus obtained is cured when allowed to stand at room temperature (25° C.±10° C.). Known molding methods, curing conditions, etc. can be adopted depending on the type of the composition.

Because the curable organopolysiloxane composition of the present invention provides highly heat-resistant cured product, the composition can be suitably used as a gel, sealing agent, adhesive, coating agent, etc. for electrical and electronic or vehicle under high temperature environment. In particular, electrical and electronic component having a cured product layer of the curable organopolysiloxane composition, vehicle oil seal comprising the cured product of the composition and building sealant comprising the cured product of the composition can be exemplified.

EXAMPLES

Hereinafter, a specific description is made of the present invention with reference to Examples and Comparative Examples, but the present invention is not limited to the Examples.

Note that room temperature means 25° C., Me means a methyl group, a part means a part by weight, each degree of polymerization (a1, b1, c1) in the general following formulae (5), (6) means a number average degree of polymerization measured in gel permeation chromatography analysis using a column manufactured by Tosoh Corporation: TSKgel Super H2500 (one) and TSKgel Super HM-N (one), solvent: tetrahydrofuran, flow rate: 0.6 mL/min, detector: RI (40° C.) under conditions of column temperature of 40° C., injection volume of 50 μL and sample concentration of 0.3% by weight. The viscosity is a value measured by a rotational viscometer at 25° C.

[Chem. 11]

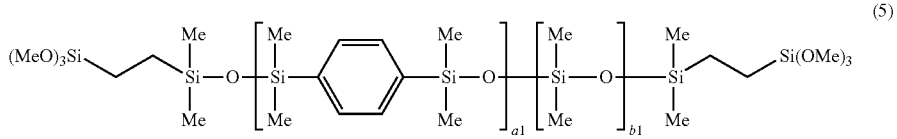

(5)

[Chem. 12]

(6)

[Chem. 13]

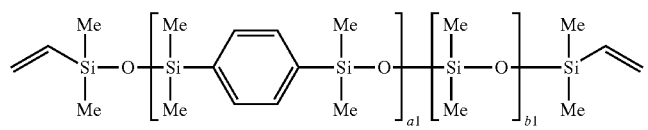

(5')

The phenylene group-containing organopolysiloxane represented by the above formula (5) was produced as follows.

Synthesis Example 1

Production of Phenylene Group-Containing Organopolysiloxane (5)

Into 500 ml separable flask equipped with a reflux tube, 101 parts of the organopolysiloxane represented by the above formula (5') having both terminals of the molecular chain blocked with a dimethylvinylsiloxy group and having a phenylene group in the main chain and 0.05 part of a solution of [chloroplatinic acid/vinylsiloxane] complex in dimethylpolysiloxane (1% by weight in terms of the weight of platinum atom) were added, followed by heating and stirring until the internal temperature of the flask reached 80° C. Next, 1.8 parts of trimethoxysilane ((MeO)$_3$SiH) was added, followed by stirring at 80° C. for 12 hours. Subsequently, volatile components were evaporated by heating under reduced pressure, and to the reaction solution (crude product) after evaporation, 2 parts of activated carbon (Shirasagi AS (Japan EnviroChemicals, Limited)) of pH 6.6 was added to remove colored components in the reaction solution. In this way, 60 parts of the organopolysiloxane represented by the above formula (5) containing a phenylene group in the main chain was obtained.

Example 1

To 10.0 parts of the phenylene group-containing organopolysiloxane represented by the above formula (5) (a1=11, b1=250), 0.010 part of dioctyltin diversatate was added, followed by sufficient mixing until the mixture became uniform, to prepare a curable composition (composition 1). The composition 1 was allowed to stand at room temperature for complete curing. In this way, a cured silicone rubber 1 was obtained.

Example 2

To 10.0 parts of the phenylene group-containing organopolysiloxane represented by the above formula (5) (a1=11, b1=250), 9.2 parts of the organopolysiloxane represented by the above formula (6) having a viscosity of 700 mPa·s having silanol groups (hydroxy groups bonded to a silicon atom) at both terminals of the molecular chain (c1=200, dimethylpolysiloxane having both terminals of the molecular chain blocked with a hydroxydimethylsiloxy group) and 0.019 part of tin (II) octylate were added, followed by sufficient mixing until the mixture became uniform, to prepare a curable composition (composition 2). The composition 2 was allowed to stand at room temperature for complete curing. In this way, a cured silicone rubber 2 was obtained.

Example 3

To 12.0 parts of the phenylene group-containing organopolysiloxane represented by the above formula (5) (a1=11, b1=250), 11.0 parts of the organopolysiloxane represented by the above formula (6) having a viscosity of 700 mPa·s having silanol groups (hydroxy groups bonded to a silicon atom) at both terminals of the molecular chain (c1=200, dimethylpolysiloxane having both terminals of the molecular chain blocked with a hydroxydimethylsiloxy group) and 0.018 part of tin (II) octylate were added, followed by sufficient mixing until the mixture became uniform, to prepare a curable composition (composition 3). The composition 3 was allowed to stand at room temperature for complete curing. In this way, a cured silicone rubber 3 was obtained.

Comparative Example 1

To 10.0 parts of the a1=0 phenylene group-free organopolysiloxane in the above formula (5) (a1=0, b1=200), 0.010 part of dioctyltin diversatate was added, followed by sufficient mixing until the mixture became uniform, to prepare a curable composition (composition 4). The composition 4 was allowed to stand at room temperature for complete curing. In this way, a cured silicone rubber 4 was obtained.

Comparative Example 2

To 10.0 parts of the a1=0 phenylene group-free organopolysiloxane in the above formula (5) (a1=0, b1=200), 9.2 parts of the organopolysiloxane represented by the above formula (6) having a viscosity of 700 mPa·s having silanol groups (hydroxy groups bonded to a silicon atom) at both terminals of the molecular chain (c1=200, dimethylpolysiloxane having both terminals of the molecular chain blocked with a hydroxydimethylsiloxy group) and 0.019 part of tin (II) octylate were added, followed by sufficient mixing until the mixture became uniform, to prepare a curable composition (composition 5). The composition 5 was allowed to stand at room temperature for complete curing. In this way, a cured silicone rubber 5 was obtained.

Comparative Example 3

To 12.0 parts of the a1=0 phenylene group-free organopolysiloxane in the above formula (5) (a1=0, b1=200), 11.0 parts of the organopolysiloxane represented by the above formula (6) having a viscosity of 700 mPa·s having silanol groups (hydroxy groups bonded to a silicon atom) at both terminals of the molecular chain (c1=200, dimethylpolysiloxane having both terminals of the molecular chain blocked with a hydroxydimethylsiloxy group) and 0.018 part of tin (II) octylate were added, followed by sufficient mixing until the mixture became uniform, to prepare a curable composition (composition 6). The composition 6 was allowed to stand at room temperature for complete curing. In this way, a cured silicone rubber 6 was obtained.

Comparative Examples 4 and 5

10.0 parts of the phenylene group-containing organopolysiloxane represented by the above formula (5) (a1=11, b1=250) and 10.0 parts of phenylene group-free organopolysiloxane (a1=0, b1=200) in the above formula (5) were each allowed to stand at room temperature, but none of them reached cure.

For the cured silicone rubbers 1 to 6 that were the cured products of the compositions 1 to 6 obtained in the above Examples and Comparative Examples, the change in rubber hardness over time in an air atmosphere at 230° C. was measured using a durometer (TYPE C) in JIS K-6249. From the measured hardness, the rate of change from the initial to after 700 hours was determined. Furthermore, the weight reduction rate was determined by performing weighting in a timely manner with a precision balance (XS 204 manufactured by Mettler Toledo International Inc.). The heat resistance was evaluated from the changes of these two values. The results are shown in Tables 1 and 2.

hours markedly increase such that the change rates are 34% to a maximum of 59%, compared to those of Examples 1 to 3. Accordingly, it can be considered that the compositions 4 to 6 are inferior in heat resistance. In addition, the ratio of residual weight is 91 to 93% after 700 hours, indicating that the weight reduction rate is larger, compared to those of Examples 1 to 3. From the above results, it is clear that the component (A) is essential to the requirements of the present invention.

Furthermore, the compositions of Comparative Examples 4 and 5 (two types of a phenylene group-containing organopolysiloxane alone and phenylene group-free organopolysiloxane alone) do not contain the component (B) that is essential to the present invention, so that they cannot sufficiently promote crosslinking of the components (A) with

TABLE 1

Heat resistance at 230° C. for 700 hours (in air atmosphere, open system)

| | Hardness | | | | Time (hr) | | | | | Rate of change |
|---|---|---|---|---|---|---|---|---|---|---|
| | (Durometer TYPE C) | 0 | 100 | 200 | 300 | 400 | 500 | 700 | (%) |
| Example 1 | Cured silicone rubber 1 | 53 | 52 | 49 | 51 | 50 | 48 | 52 | 1.9 |
| Example 2 | Cured silicone rubber 2 | 50 | 47 | 48 | 46 | 46 | 47 | 47 | 6.0 |
| Example 3 | Cured silicone rubber 3 | 51 | 50 | 47 | 47 | 46 | 46 | 47 | 7.8 |
| Comparative Example 1 | Cured silicone rubber 4 | 58 | 52 | 51 | 46 | 55 | 65 | 78 | 34.4 |
| Comparative Example 2 | Cured silicone rubber 5 | 55 | 49 | 50 | 48 | 44 | 63 | 76 | 38.2 |
| Comparative Example 3 | Cured silicone rubber 6 | 54 | 52 | 65 | 65 | 78 | 82 | 86 | 59.3 |
| Comparative Example 4 | — | | | Not measured because it is not cured | | | | | |
| Comparative Example 5 | — | | | | | | | | |

TABLE 2

Change in ratio of residual weight

| Ratio of residual weight | | | | Time (hr) | | | | |
|---|---|---|---|---|---|---|---|---|
| | (%) | 0 | 100 | 200 | 300 | 400 | 500 | 700 |
| Example 1 | Cured silicone rubber 1 | 100 | 98.5 | 97.9 | 97.3 | 97.1 | 96.6 | 96.1 |
| Example 2 | Cured silicone rubber 2 | 100 | 98.1 | 97.7 | 97.4 | 97.1 | 96.8 | 96.4 |
| Example 3 | Cured silicone rubber 3 | 100 | 97.9 | 97.4 | 97.1 | 96.7 | 96.5 | 96.3 |
| Comparative Example 1 | Cured silicone rubber 4 | 100 | 97.9 | 97.2 | 96.9 | 95.8 | 94.2 | 92.5 |
| Comparative Example 2 | Cured silicone rubber 5 | 100 | 98.1 | 97.3 | 96.5 | 95.1 | 93.8 | 92.4 |
| Comparative Example 3 | Cured silicone rubber 6 | 100 | 97.8 | 95.3 | 94.1 | 92.7 | 92.1 | 91.2 |
| Comparative Example 4 | — | | | Not measured because it is not cured | | | | |
| Comparative Example 5 | — | | | | | | | |

It is clear that the cured silicone rubbers 1 to 3 obtained from the compositions 1 to 3 of Examples 1 to 3 have good heat resistance, because they satisfy the requirements of the present invention in that the changes in hardness after 700 hours have change rates of 2% to a maximum of 8%. Also, the ratio of residual weight after 700 hours is at a level of 96% or more in all cases.

On the other hand, the cured silicone rubbers 4 to 6 obtained from the compositions 4 to 6 of Comparative Examples 1 to 3 do not contain the component (A) that is essential to the present invention, so that they do not exhibit heat resistance derived from the organopolysiloxane having an arylene group in the main chain. As a result, the changes in hardness of these cured silicone rubbers 4 to 6 after 700 each other to cure the composition. From this, the component (B) is essential to the requirements of the present invention.

From the above, the cured products obtained from the curable organopolysiloxane composition obtained from the above Examples 1 to 3 satisfying the requirements of the present invention are effective for exhibition of high heat resistance.

INDUSTRIAL APPLICABILITY

The cured product obtained by curing the curable organopolysiloxane composition of the present invention has high heat resistance, so that its use as a gel, sealing agent, adhesive, coating agent, etc. for electrical and electronic use or vehicle in high temperature environment can be expected.

The invention claimed is:

1. A curable organopolysiloxane composition comprising:
   (A) 100 parts by weight of an organopolysiloxane represented by the following general formula (1):

[Chem. 1]

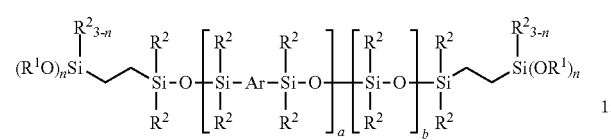

(1)

wherein $R^1$ is the same or different alkyl group or alkoxy-substituted alkyl group having 1 to 6 carbon atoms, $R^2$ is a group selected from the same or different alkyl group having 1 to 20 carbon atoms, an aryl group having 6 to 20 carbon atoms, and a group in which a part of the hydrogen atoms of these groups is substituted with a halogen atom, Ar is an arylene group having 6 or more carbon atoms, a is an integer of 1 to 1,000, b is an integer of 1 to 5,000, and n is each independently an integer of 1 to 3, provided that the total of n in unsubstituted or substituted alkoxysilyl groups present at both terminals of the molecular chain is 3 or more, and
   (B) 0.01 to 10 parts by weight of a curing catalyst.

2. The curable organopolysiloxane composition according to claim 1 wherein the curing catalyst is a tin-containing metal compound.

3. The curable organopolysiloxane composition according to claim 1 or 2 further comprising:
   (C) 1 to 500 parts by weight of an organopolysiloxane containing two or more hydroxy groups or unsubstituted or alkoxy-substituted alkoxy groups in one molecule represented by any of the following general formulae (2) to (4), per 100 parts by weight of the component (A):

[Chem. 2]

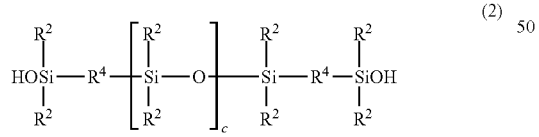

(2)

[Chem. 3]

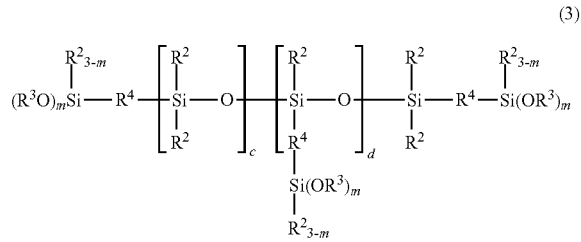

(3)

[Chem. 4]

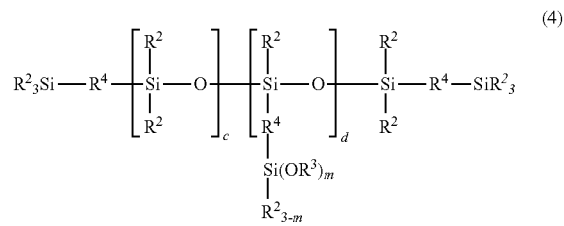

(4)

wherein $R^2$ is a group selected from the same or different alkyl group having 1 to 20 carbon atoms, an aryl group having 6 to 20 carbon atoms, and a group in which a part of the hydrogen atoms of these groups is substituted with a halogen atom, $R^3$ is a hydrogen atom, or the same or different alkyl group or alkoxy-substituted alkyl groups having 1 to 6 carbon atoms, $R^4$ is an oxygen atom or the same or different alkylene group having 1 to 12 carbon atoms, m is each independently an integer of 1 to 3, c is an integer of 1 or more and d is an integer of 1 to 10.

4. An electrical and electronic component having a cured product layer of the curable organopolysiloxane composition according to claim 1.

5. A vehicle oil seal comprising a cured product of the curable organopolysiloxane composition according to claim 1.

6. A building sealant comprising a cured product of the curable organopolysiloxane composition according to claim 1.

7. An organopolysiloxane represented by the following general formula (1):

[Chem. 5]

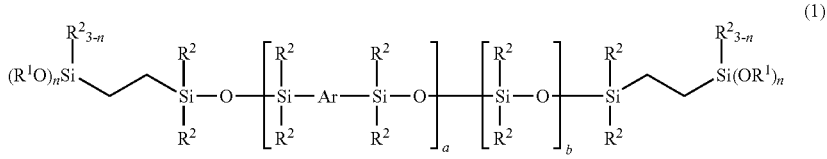

(1)

wherein $R^1$ is the same or different alkyl group or alkoxy-substituted alkyl group having 1 to 6 carbon atoms, $R^2$ is a group selected from the same or different alkyl group having 1 to 20 carbon atoms, an aryl group having 6 to 20 carbon atoms, and a group in which a part of the hydrogen atoms of these groups is substituted with a halogen atom, Ar is an arylene group having 6 or more carbon atoms, a is an integer of 1 to 1,000, b is an integer of 1 to 5,000, and n is each independently an integer of 1 to 3, provided that the total of n in unsubstituted or substituted alkoxysilyl groups present at both terminals of the molecular chain is 3 or more.

\* \* \* \* \*